Jan. 8, 1952 T. J. SMULSKI 2,582,173
WIPER ARM APPARATUS
Filed Jan. 5, 1946 2 SHEETS—SHEET 1

INVENTOR
THEODORE J. SMULSKI
BY
Charles S. Penfold
ATTORNEY

Jan. 8, 1952 T. J. SMULSKI 2,582,173
WIPER ARM APPARATUS
Filed Jan. 5, 1946 2 SHEETS—SHEET 2
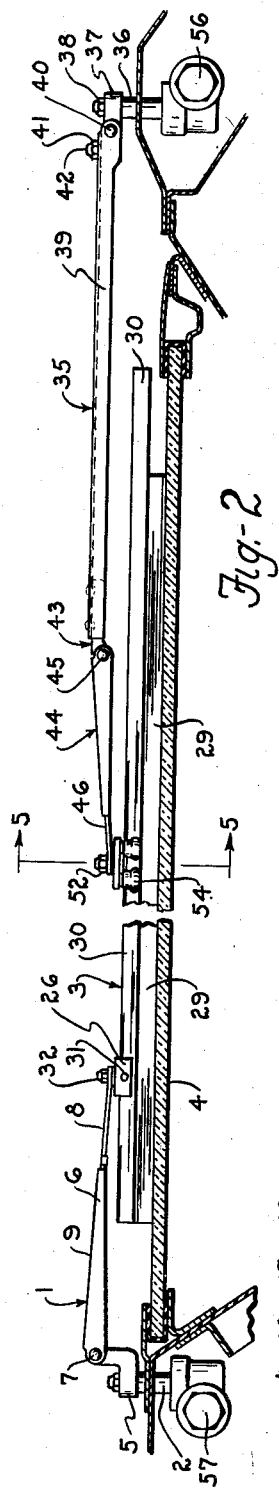
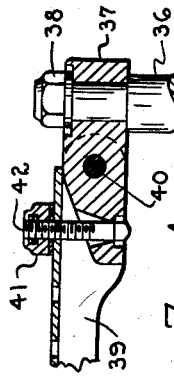
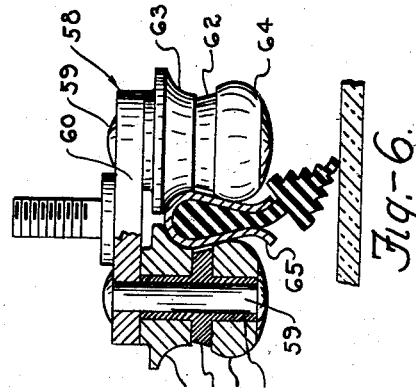
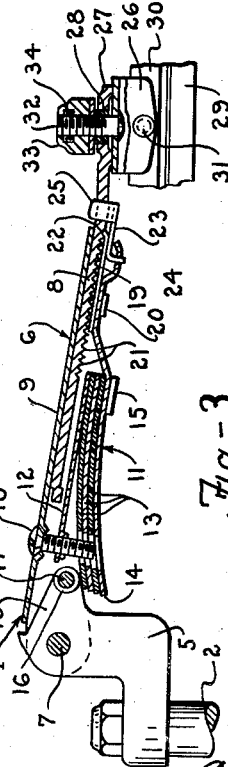
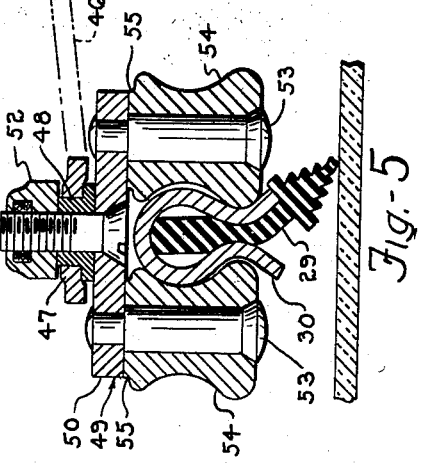
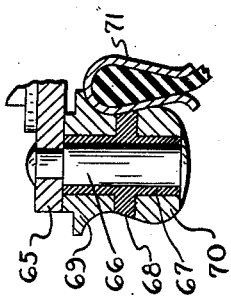
INVENTOR
THEODORE J. SMULSKI
BY
Charles S. Penfold
ATTORNEY Patented Jan. 8, 1952

2,582,173

UNITED STATES PATENT OFFICE 2,582,173

WIPER ARM APPARATUS

Theodore J. Smulski, Gary, Ind., assignor to Productive Inventions, Inc., a corporation of Indiana Application January 5, 1946, Serial No. 639,385

8 Claims. (Cl. 15—251)

This invention relates to windshield wipers of unusual length, such, for example, as wipers designed for use on the bombardier's window of an aircraft.

All windshield wipers employed on aircraft are exposed to conditions of extreme severity as compared with those encountered upon surface vehicles. The high wind velocity to which the wiper is exposed because of the high relative air speed tends to interfere with orderly and regular operation, and to affect the contact of the wiper blade with the window surface. It is necessary to increase the operating power in order to avoid erratic response caused by wind conditions. It is also necessary to increase the pressure of the wiper against the window in order to make sure of an effective wiping action, and this again necessitates an increase of the operating power. Because of the high velocity of the aircraft, the depositing of precipitation upon the window is at a very high rate, and this makes it desirable to operate the windshield wiper at a much faster rate than the wiper of a surface vehicle.

When there is added to all of these factors, the necessity of providing a wiper arm of extraordinary length as in the case of the bombardier's window, the severity of the forces to which the wiper arm and the wiper blade are subjected is very greatly increased, and the bending and buckling strains are extremely severe.

In view of these considerations, it has been proposed to provide a plurality of synchronously driven wiper arms in association with opposite ends of a wiper blade for coordinately acting upon the wiper blade or cleaner to carry it to and fro over the surface to be wiped.

The present invention has to do with the construction and arrangement of the wiper arms in such a combination, and with the combination of the wiper arms with the wiper blade.

It is an important object of the invention to provide for the proper application and adjustment of pressure from each of the wiper arms to the wiper blade so that the wiper blade will be caused to bear with substantial uniformity throughout its length against the window to be wiped. It is a further object of the invention to provide a practical and advantageous pivotal and sliding connection between the wiper blade and the operating arm therefor.

It is a particular feature of the invention that one of the wiper arms is equipped with opposed rollers between which the wiper blade holder or frame may move longitudinally without binding, and without excessive frictional resistance.

Other objects and advantages will hereinafter appear.

Figure 2 is a sectional view illustrating the structure shown in Figure 1, with parts again broken away for compactness;

Figure 3 is a partial sectional view of one of the wiper arms;

Figure 4 is a partial sectional view of a part of the other wiper arm employed;

Figure 5 is a sectional view taken upon the line 5—5 of Figure 2 looking in the direction of the arrows, the section being taken through a roller unit which forms part of the movement modifying or auxiliary operating arm;

Figure 6 is a view similar to Figure 5, but taken through a modified form of roller unit and wiper blade; and Figure 7 is a partial sectional view of a modified roller unit.

Figure 1:
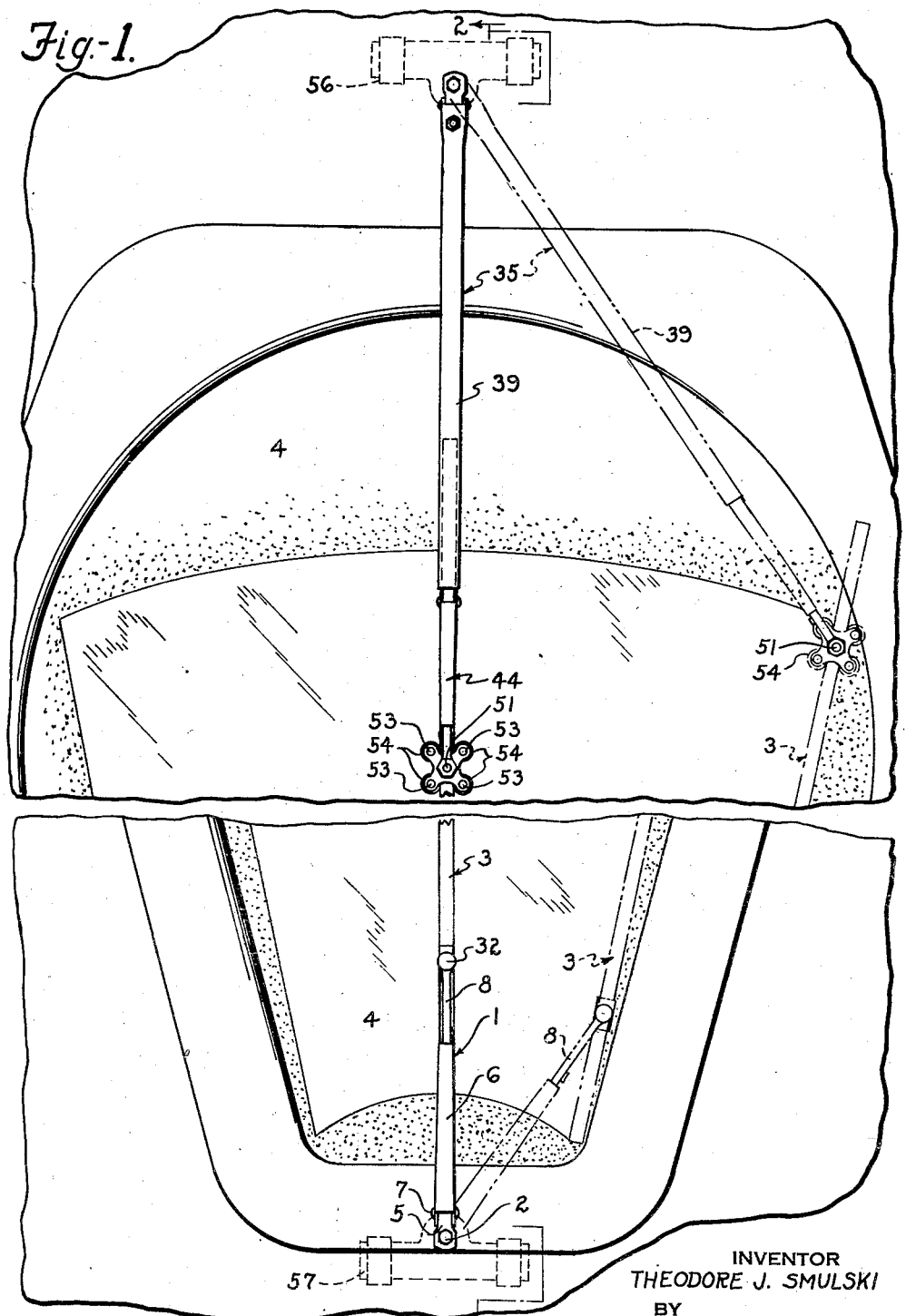
Figure 1 is a fragmentary view in elevation of a bombardier's window with the novel windshield wiper apparatus applied thereto, certain parts being broken away intermediate the ends of the structure illustrated for the sake of compactness.

As seen in Figure 1, a wiper arm 1 is affixed to an oscillatory operating shaft 2, and has free pivotal connection with a wiper blade 3. The blade 3 is designed to act upon the glass 4 of the bombardier's window of an airplane or window of a fast transport plane.

The wiper arm 1 may be in all respects of conventional construction. The arm desirably comprises a fitting 5 which is affixed to the shaft, a biased section 6 which is pivotally mounted upon fitting 5 through the medium of a pivot pin 7, and an extensible section 8 which is telescoped into the section 6, and which is adapted to be fixed in adjusted position.

The wiper arm section 6 comprises a channel member 9 having ears 10, which embrace ears formed on the fitting 5. It is through these ears 10 that the pivot pin 7 is passed for pivotally supporting the channel section 6.

Partially within the channel of the member 9 there is located a spring assembly generally designated 11 comprising a rigid plate 12 and a series of leaf springs 13 and an additional leaf spring 14. The plate 12 is provided with fingers 15 which are wrapped around the collection of spring leaves to hold the parts in assembled relation. The spring leaves and the plate 12 are formed with interfitting formations to prevent relative longitudinal movement of the individual parts. The normal tendency of the spring leaves is to lie against the plate 12.

The forward leaf 13 bears against a roller 16 which is mounted upon a pin 17, the latter being carried by the fitting 5 at the outer end thereof. A screw 18 is passed through the bottom wall of the channel member 9 and threaded through the inner end of the plate 12. By turning the screw, the inner end of the plate 12 may be forced forward toward the bottom wall of the channel member 9, and since the inner ends of the leaves 13 cannot follow because of the obstruction interposed by the roller 16, the leaf springs are stressed and tend to rock the wiper arm section 6 rearwardly toward the windshield about the axis of pin 7.

The outer end of the spring 14 extends over a spring plate 19, portions of which rest upon the side walls of channel member 9. Fingers 20 formed on said side walls are folded around to embrace a portion of the spring 14, and serve both to hold the spring 14 against longitudinal shifting and to hold it in assembled relation with the inner end of the plate 36 and with the channel member 9.

The extensible wiper section 8 is slidably mounted between the spring plate 19 and the forward wall of the channel member 9. The rear face of member 8 is provided with a series of alternate teeth and notches, the teeth being designated 21. These notches are provided at frequent intervals. The notches are adapted to be engaged selectively by a nose portion 22 at the outer end of the spring plate 19. The nose portion 22 has to be forced into a notch, however, the tendency of the spring plate 19 being to hold the nose clear of the teeth 21.

A locking lever 23 is provided with a lug 24 through which it is pivoted in an offset end portion of the spring 14. A portion of the lever is disposed between the spring plate 19 and the outer extremity of the spring 14 and its free end is provided with a finger piece 25 for operating the same.

When the lever 23 is in the longitudinally extending position illustrated in Figure 3 it is pressed firmly against the outer end of the spring plate 19 and is thereby caused to force the nose portion of the plate 19 into one of the notches of the member 8. With the parts in this condition, the member 8 is securely locked against longitudinal movement.

When it is desired to adjust the lengthwise position of the member 8, the lever 23 is operated to a transverse or semaphore position in which it extends freely between the spring plate 19 and the offset portion of the spring 14 in which it is pivoted. In such position, the nose 22 moves or springs clear of the teeth 21 so that the member 8 can be freely extended or retracted as desired and then locked.

The wiper arm section 8 is desirably connected to a clip 26, forming part of the wiper blade, with capacity for free pivoting of the wiper blade relative to the arm section.

The outer end of the member 8 is generally flat, but is formed with a boss or circular raised area 27 at its forward side and a corresponding circular depressed area at its rearward side. A spacer bushing 28 extends through the center of this region of displacement.

The wiper blade 3 comprises a flexible wiping element 29 and a rigid, channeled, metallic blade holder or frame 30. The blade frame 30 is embraced by the clip 26, and is rockingly supported from the clip by a rivet 31 which is passed through the clip walls, the blade frame 30, and the wiping element 29. A headed bolt 32 extends through the forward wall of the clip 26 and through the bushing 28, and is held in assembled relation with the bushing and the arm section 8 by an elastic stop nut 33. The stop nut 33 is of well-known construction, comprising a metallic body formed with an annular recess, which has a fiber washer 34 trapped in it.

The pressure of the nut 33 is transmitted through the bushing 28 to the clip 26. The bushing 28 is of greater thickness than the metal of the arm member 8 through which it passes, so that no pressure is applied to the member 8, and the wiper blade assembly described, together with its mounting means, is free to turn about the axis of the bolt 32 in relation to the member 8.

The wiper blade 3 is of extraordinarily great length, and the clip 26 is secured to the blade frame near one end of the blade frame, not at the mid-point as is the customary practice.

At the opposite side of the window 4 from the shaft 2, a movement modifying and auxiliary driving arm generally designated 35 is secured upon an oscillating shaft 36. The arm 35 may be in all respects like the arm 1 illustrated in Figure 3 of my copending application, Serial No. 639,384 filed January 5, 1946, now Patent No. 2,550,095, April 24, 1951, but at the end thereof remote from the shaft 36, the arm 35 carries a roller unit for engagement with the blade frame 30, which will be described. The arm 35 comprises a supporting section 37 which is affixed to the shaft 36 by means of a nut 38. An extension channel 39 is pivotally secured to the supporting section 37 by means of a pivot pin 40.

The channel member 39 is adapted for pivotal adjustment about the axis of the pivot pin 40, the limit of movement of the channel member 39 away from the windshield being determined by the adjustment of an elastic stop nut 41 which is threaded upon a bolt 42. The head of the bolt engages a recess in a portion of the rear face of section 37, and the shank extends forwardly through said section and through the channel member 39, the nut 41 being threaded upon the forward protruding end of the bolt 42. The outer end of channel member 39 is combined with a further channel member 43 received thereon to provide a lengthwise adjustable extension section.

A biasing wiper arm section 44 is mounted upon channel member 43 through a cross pin or rivet 45. An additional wiper arm section 46 is carried by the wiper arm section 44, and is telescopically adjustable with respect thereto. The wiper arm sections 44 and 46 are desirably exact duplicates in all respects of the wiper arm sections 6 and 8 which have already been described. The arm sections 44 and 46 are biased toward the windshield by a biasing spring as described in connection with arm sections 6 and 8, and this spring is adapted for adjustment in the manner which has been described.

The outer end of arm section 46 is provided with a forwardly displaced circular area or boss 47 through which a bearing bushing 48 extends. A roller unit 49 comprises a base plate 50 through which a headed bolt 51 extends forwardly. An elastic stop nut 52 is threaded onto the forward end of the bolt 51 and clamps the bushing 48 firmly against the mounting plate 50. The bushing is of sufficient thickness to prevent clamping of arm section 46 by the nut 52, so that the roller unit is freely pivoted on the arm section 46.

The roller unit as illustrated includes four bearing rivets or pins 53 which are secured to the plate 50 with their axes parallel to one another and quadrangularly related. As shown, the four axes of the pivot pins 53 are disposed at the corners or vertices of a square or 90 degrees apart circumferentially. Each pin 53 carries a rotatable roller 54. Each roller is preferably provided with a circular boss portion 55 engageable with the plate 50. With the disposition of the bearing pins 53 referred to, the rollers are arranged in opposed pairs. The blade frame 30, which is of bulbous contour in cross section, fits between the opposed pairs of rollers, the rollers being of varied diameters to fit against opposite sides of the blade frame and trap the blade frame between them.

With the construction described, the roller unit is free to turn or pivot relative to the wiper arm 46, but no pinching or binding of the roller unit upon the blade frame can occur by reason of the fact that the pair of embracing rollers are spaced substantially from one another longitudinally of the blade frame.

It will be evident that the roller unit is free to roll longitudinally along the blade frame but that it is inseparable from the blade frame and controls the attitude of the blade frame relative to the windshield. It will also be evident that biasing pressure may be applied through arm sections 44 and 46 to press the wiper blade toward the windshield with regulated pressure. Since the pressure applied by either arm can be adjusted, it is a simple matter to secure proper and substantially even bearing of the wiper blade against the windshield throughout the length of the wiper blade or other element which may be carried by the holder.

While the wiper arm 1 is shown as pivotally connected to the clip 26, and the arm section 46 is shown as pivotally connected to the mounting plate 50 of the roller unit 49, either pivot may readily be eliminated if desired. This is accomplished, for example, by backing off the nut 52, removing the bushing 48, reinserting the bolt 51 through the wiper section 46, and screwing up the nut 52 to clamp the arm section 46 firmly against the plate 50. While it is possible to eliminate either pivot, it is not feasible in a combination of the kind illustrated.

The shafts 2 and 36 may be oscillated through the same or different ranges of angular movement, but are preferably driven in timed relation to one another. Synchronization may be obtained in any suitable manner as by providing a common mechanical drive for the shafts, or by providing a common control for pneumatic or hydraulic driving motors, or by the utilization of synchronized electric motors. Motors 56 and 57 as illustrated are of the hydraulic type. Obviously, the arrangement may provide for driving one arm and allowing the other arm to freely oscillate about its shaft.

In Figure 6 a modified form of roller unit 58 is illustrated, this unit being substitutable in its entirety for the roller unit 49 above described. Four rivets or bearing pins 59 are provided as before upon a supporting blade 60, the pins being disposed in parallel relation and quadrangularly related. Upon each pin 59 there is mounted a bearing sleeve 61, the bearing sleeve being formed midway of its length with a circumferential flange 62. Instead of mounting a single roller on each bearing pin 59, two axially aligned rollers 63 and 64 are provided which are spaced from one another by the flange 62. The aligned rollers and spacing flange define a contour adapted substantially to fit the cross-sectional contour of the blade frame 65. The rollers 63 and 64 are rotatable upon the sleeve 61. Thus, the rollers 63 and 64 may all have rolling engagement with the blade frame, and may all turn at different speeds according to the different effective diameters or dimensions of the parts. The capacity of these parts to turn at different speeds greatly reduces the friction between the rollers and the blade frame, reducing the power required to drive the parts, and also reducing the wear between these and other parts of the assembly. It will be apparent that in the construction of Figure 6 there is provided a plurality of pairs of axially aligned sets of rollers, the axes of said sets being quadrangularly related, for embracing and confining a portion of the wiper blade and maintaining rolling engagement therewith. It is of course to be understood that each sleeve may carry more than a pair of rollers.

Figure 7 illustrates a further modification of a roller unit. In this modification the mounting 65 carries four shafts 66, which are shouldered against the mounting. Each shaft rotatably supports a sleeve 67 having a radial flange 68. Rollers 69 and 70 are rotatably mounted on the sleeve on opposite sides of the flange. The rollers and sleeve are so constructed and arranged that the rollers may rotate with respect to the sleeve and the sleeve may rotate with respect to the shaft, when engaging the holder 71. The friction is thus materially reduced.

In certain applications it might be found desirable to employ a roller unit comprised of three rollers, in which event, a pair would be disposed on one side of the wiper or cleaner frame and one on the opposite side between the pair.

I have described what I believe to be the best embodiments of my invention. I do not wish, however, to be confined to the embodiments shown, but what I desire to cover by Letters Patent is set forth in the appended claims.

I claim:

1. In a windshield wiper, the combination with a wiper blade and an oscillatory operating arm pivotally connected thereto, of a movement modifying arm pivotally mounted at a point removed from the oscillatory axis of the operating arm, said modifying arm including a roller unit having a plurality of pairs of opposed rollers whose axes are quadrangularly related, for embracing a portion of the wiper blade and maintaining rolling engagement therewith, said rollers also being arranged so that their axes are disposed substantially perpendicular to the path of movement of the blade.

2. In a windshield wiper, the combination with a wiper blade and an oscillatory operating arm pivotally connected thereto, of a movement modifying arm pivotally mounted at a point removed from the oscillatory axis of the operating arm, said modifying arm including a roller unit pivotally mounted thereon and having a plurality of pairs of opposed rollers whose axes are quadrangularly related, for embracing a portion of the wiper blade and maintaining rolling engagement therewith, said rollers also being arranged so that their axes are disposed substantially perpendicular to the path of movement of the blade.

3. In a windshield wiper, the combination with a wiper blade and an oscillatory operating arm pivotally connected thereto, of a movement modifying arm pivotally mounted at a point removed from the oscillatory axis of the operating arm, and said modifying arm including rollers for embracing a portion of the wiper blade and maintaining rolling engagement therewith, said rollers also being arranged so that their axes are disposed substantially perpendicular to the path of movement of the blade.

4. In a windshield wiper, the combination with a wiper blade and an oscillatory first arm pivotally connected thereto, of a second arm adapted to be pivotally mounted at a point removed from the oscillatory axis of the first arm, said second arm including a roller unit having a plurality of pairs of opposed rollers whose axes are quadrangularly related, for embracing a portion of the wiper blade and maintaining rolling engagement therewith, said rollers also being arranged so that their axes are disposed substantially perpendicular to the path of movement of the blade.

5. In a windshield wiper, the combination with a wiper blade and an oscillatory first arm pivotally connected thereto, of a second arm adapted to be pivotally mounted at a point removed from the oscillatory axis of the first arm, said second arm including a roller unit pivotally mounted thereon and having a plurality of pairs of opposed rollers whose axes are quadrangularly related, for embracing a portion of the wiper blade and maintaining rolling engagement therewith, said rollers also being arranged so that their axes are disposed substantially perpendicular to the path of movement of the blade.

6. In a windshield wiper, the combination with a wiper blade and an oscillatory first arm pivotally connected thereto, of a second arm adapted to be pivotally mounted at a point removed from the oscillatory axis of the first arm, and said second arm including rollers, for embracing a portion of the wiper blade and maintaining rolling engagement therewith, said rollers also being arranged so that their axes are disposed substantially perpendicular to the path of movement of the blade.

7. In a windshield wiper, the combination with a wiper blade and an oscillatory first arm pivotally connected thereto, of a second arm adapted to be pivotally mounted at a point removed from the oscillatory axis of the first arm, said second arm including a roller unit having a plurality of pairs of opposed rollers whose axes are quadrangularly related, for embracing a portion of the wiper blade and maintaining rolling engagement therewith, said rollers also being arranged so that their axes are disposed substantially perpendicular to the path of movement of the blade and means for driving either or both arms.

8. In a windshield wiper, the combination with a wiper blade and an oscillatory first arm pivotally connected thereto, of a second arm adapted to be pivotally mounted at a point removed from the oscillatory axis of the first arm, and said second arm including rollers, for embracing a portion of the wiper blade and maintaining rolling engagement therewith, said rollers also being arranged so that their axes are disposed substantially perpendicular to the path of movement of the blade and means for driving either or both arms.

THEODORE J. SMULSKI.

REFERENCES CITED

The following references are of record in the file of this patent:

UNITED STATES PATENTS

| Number | Name | Date |
| --- | --- | --- |
| 1,027,359 | Schorndorfer | May 21, 1912 |
| 1,656,996 | Anderson | Jan. 24, 1928 |
| 2,376,013 | Sacchini | May 15, 1945 |